United States Patent [19]

Toral et al.

[11] Patent Number: 5,405,101
[45] Date of Patent: Apr. 11, 1995

[54] SUPPORTING CORE FOR WOUND-UP RECORDING MEDIA

[75] Inventors: Jose Toral; August Liepold, both of Munich; Gottfried Lutz, Seefeld; Hartmut Thiele, München, all of Germany

[73] Assignee: BASF Magnetics GmbH, Mannheim, Germany

[21] Appl. No.: 56,792

[22] Filed: May 4, 1993

[30] Foreign Application Priority Data

May 12, 1992 [DE] Germany .................. 9206399 U

[51] Int. Cl.⁶ ............................................. B65H 75/18
[52] U.S. Cl. ................................... 242/600; 242/610; 242/610.6; 242/613.4
[58] Field of Search ............. 242/68.5, 118, 118.31, 242/118.32, 118.61, 118.62, 600, 610, 610.6, 613, 613.4; 206/389

[56] References Cited

U.S. PATENT DOCUMENTS

| 2,964,174 | 12/1960 | Litchfield et al. | 242/610.6 |
| 4,883,178 | 11/1989 | Thiele et al. | 206/391 |
| 4,919,358 | 4/1990 | Innocenti, Sr. et al. | 242/68.5 X |

FOREIGN PATENT DOCUMENTS

| 8716580 | 2/1988 | Germany . | |
| 2-282067 | 11/1990 | Japan | 206/389 |
| 1593250 | 7/1981 | United Kingdom | 242/68.5 |

Primary Examiner—Daniel P. Stodola
Assistant Examiner—John P. Darling
Attorney, Agent, or Firm—Keil & Weinkauf

[57] ABSTRACT

A hollow-cylindrical supporting core for pancakes which is produced from recyclable plastic by injection molding is described, the arms, which may be angled off, which extend from the gating point and run to the inside diameter of the supporting core remaining in place after demolding of the injection mold and being suitable as holding grips for the supporting core.

2 Claims, 1 Drawing Sheet

SUPPORTING CORE FOR WOUND-UP RECORDING MEDIA

The innovation relates to a recyclable hollow-cylindrical supporting core which can be manufactured by injection molding for the fitting on of recording media in tape form which are wound up on flangeless hubs provided with inner bores.

DE-U-87 16 580 and DE-A-40 25 906 disclose supporting cores which consist predominantly of hard plastic and are manufactured by extrusion blow molding. The choice of material and the manufacturing process entail a high price, inadequate recyclability and a complicated manufacturing process with a relatively low number of units. These are serious disadvantages in the case of such mass-produced articles, since magnetic recording media in tape form wound up on flangeless hubs and known as pancakes are produced and shipped in high numbers.

It is therefore an object of the present invention to produce a supporting core which does not have the disadvantages specified above and which moreover is also practical to handle.

We have found that this object is achieved by a supporting core which can be produced by injection molding for the fitting on of recording media in tape form which are wound up on flangeless hubs provided with inner bores, wherein a plurality of arms (3, 3', 3"), which may be angled off, extending from the gating point (2) for the suppoting core (1) inside the hollow cylinder near to one open end of the supporting core run to the inner circumference of the latter as a material connection for the purpose of fixing and gripping. Further details of the invention emerge from the drawings and the description.

The invention is explained below with reference to the drawings.

The hollow-cylindrical supporting core (1) is manufactured according to the prior art in a conventional injection-molding tool, the injection mold being designed in such a way that the material runs from a central gating point (2) via a plurality of arms (3, 3', 3") to the cavity and enters the hollow space of the cavity via the points (4, 4', 4") and thus fills the injection mold.

Figure 1:
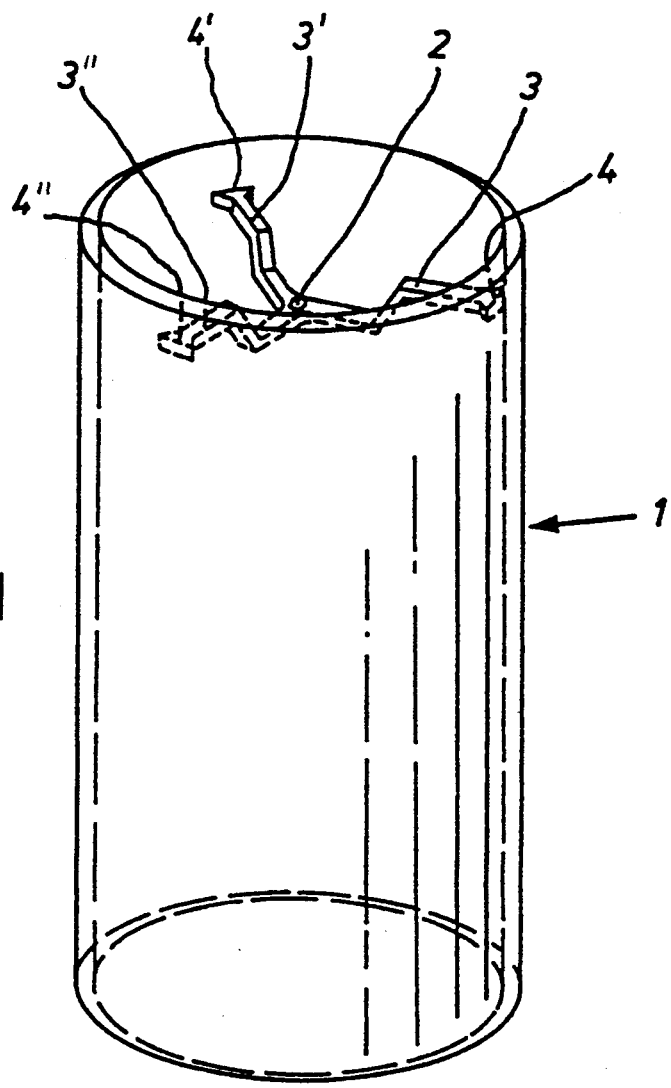
FIG. 1 shows the supporting core perspectively from the side.

Whereas usually the material issuing from the gating point to the desired shape is cut off and discarded during demolding, the essence of the invention is that this material connection, which is suitable as a holding grip for the supporting core, remains connected to the supporting core during demolding. In an expedient development, the arms (3, 3', 3") may be angled off, as FIG. 1 shows.

Figure 2:
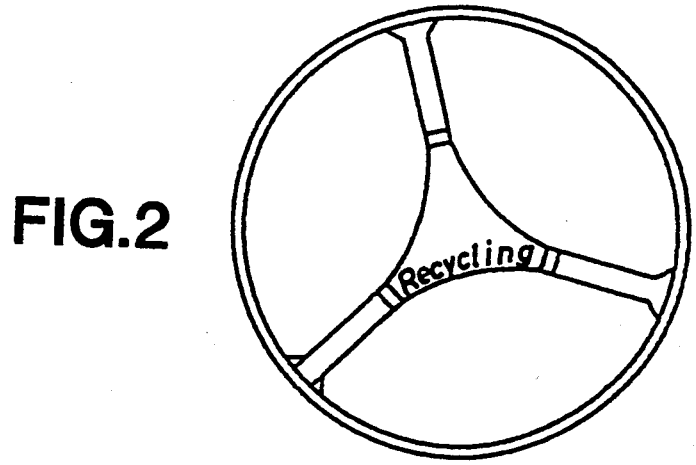
FIG. 2 shows it from above.

The material for the supporting core may be conventional recyclable plastic, for example polyethylene (PE). As FIG. 2 shows by way of example, inscriptions such as "recycling" or company details or material details may be provided on the arms.

In this way, both the manufacturing costs and the production costs for the supporting core are lowered considerably, at the same time a shape which can be handled conveniently and is attractive having been found for the supporting core, in which the arms extending from the gating point can be used as a holding grip or handle for inserting or withdrawing the supporting core between the pancakes.

We claim:

1. A recyclable hollow cylindrical supporting core for supporting hubs wound with recording tape, which core is produced by injection molding, and which core consists of a hollow cylinder having two ends, inner and outer surfaces, a longitudinal axis, a gating point located on the axis, and a plurality of arms extending from the gating point to the inner surface of the supporting core, the arms being angled from the gating point to points on the inner surface of the supporting core which points on the supporting core are perpendicular to the axis at a point other than the gating point and which points on the supporting core are adjacent to an end of the supporting core.

2. The supporting core as claimed in claim 1, which consists of polyethylene.

* * * * *